June 12, 1956

M. W. DUNDORE 2,750,018

POWER TRANSMISSON

Filed Sept. 12, 1951

Inventor:
Marvin W. Dundore.
By John Darley
Attorney.

June 12, 1956 M. W. DUNDORE 2,750,018
POWER TRANSMISSON
Filed Sept. 12, 1951 4 Sheets-Sheet 3

Inventor.
Marvin W. Dundore
By John W. Darley
Attorney.

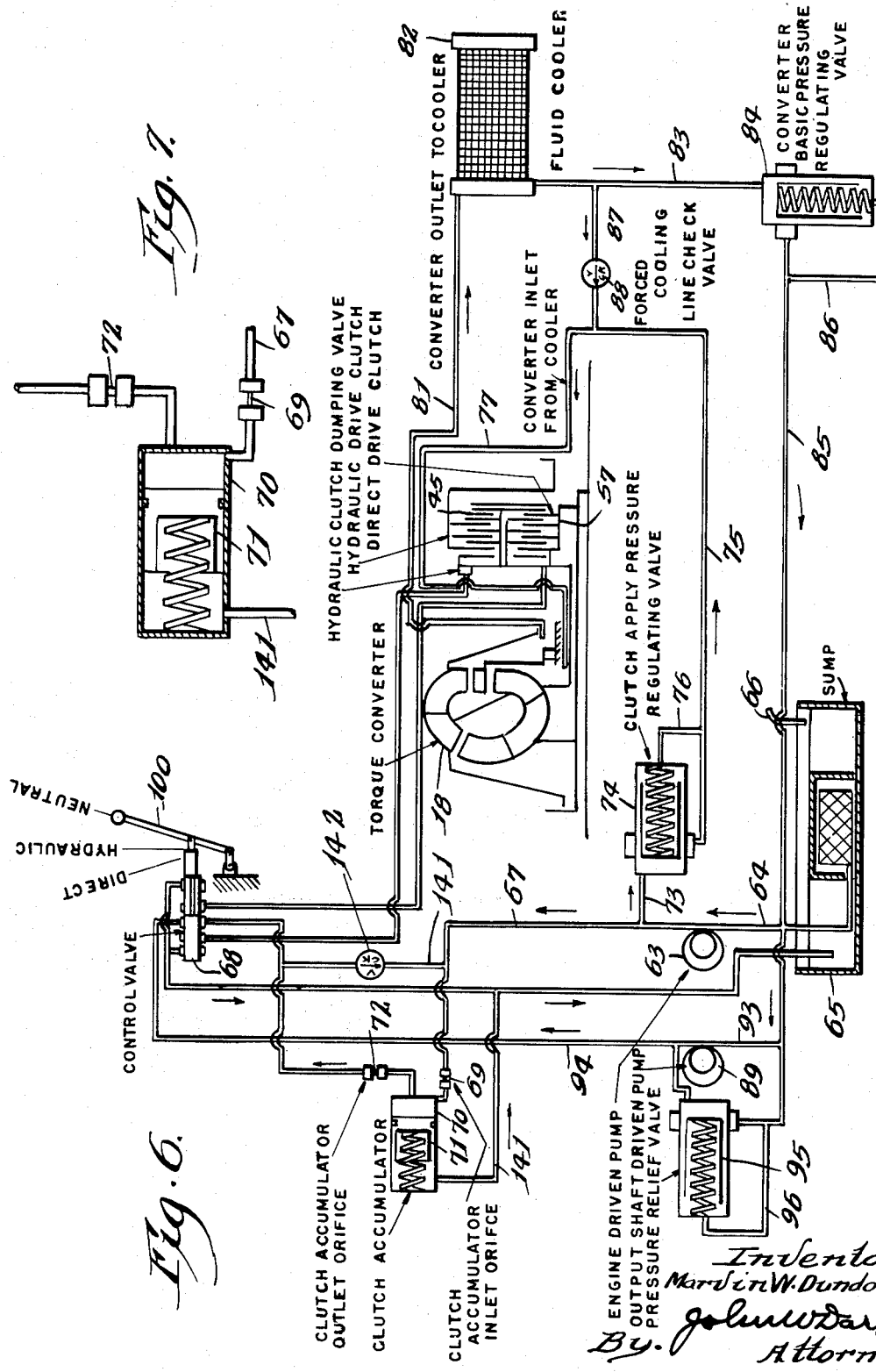

United States Patent Office 2,750,018
Patented June 12, 1956

2,750,018

POWER TRANSMISSION

Marvin W. Dundore, Rockford, Ill., assignor to Twin Disc Clutch Company, Racine, Wis., a corporation of Wisconsin Application September 12, 1951, Serial No. 246,307

3 Claims. (Cl. 192—3.2)

My invention relates to power transmissions and more particularly to a unit including provision for hydraulically transmitting power to the load during the starting and accelerating periods and for direct transmission when the load reaches a desired speed in conjunction with the ability to effect a full power shift from one drive to the other in either direction.

In units of this type, selectively controlled, hydraulically operated clutches are employed to determine hydraulic or direct drive and it is desirable to control the rate of clutch engagement to prevent shock to the vehicle and to the operator. Further, such units customarily employ a hydraulic torque converter as the power transmitting agency during hydraulic drive which is conditioned to operate as a converter during the starting and accelerating periods and as a hydraulic coupling when the vehicle attains speed. It is important that the converter be adequately cooled during converter and coupling drive and also during direct drive transmission.

It is therefore one object of the invention to provide a transmission of the character indicated which employs means for softening clutch action including an accumulator and associated orifices interposed between the clutches and a pump which provides hydraulic pressure therefor.

A further object is to provide a transmission as above having a cooling system for the converter which is arranged for a pump forced circulation therethrough during direct drive and when the converter is acting as a coupling and in which the circulation is increased when the converter is in torque multiplying range by the normal pressure differences existing within the converter.

These and further objects of the invention will be set forth in the following specification, reference being had to the accompanying drawings, and the novel means by which said objects are effectuated will be definitely pointed out in the claims.

In the drawings:

Fig. 6 is a schematic layout of the hydraulic system, including as one circuit the clutches, the two pumps and control valve, and as another circuit the hydraulic torque converter and connected cooler, the clutches being disengaged.

Fig. 7 is an enlarged detail of a part of the hydraulic system shown in Fig. 6.

Figure 1:
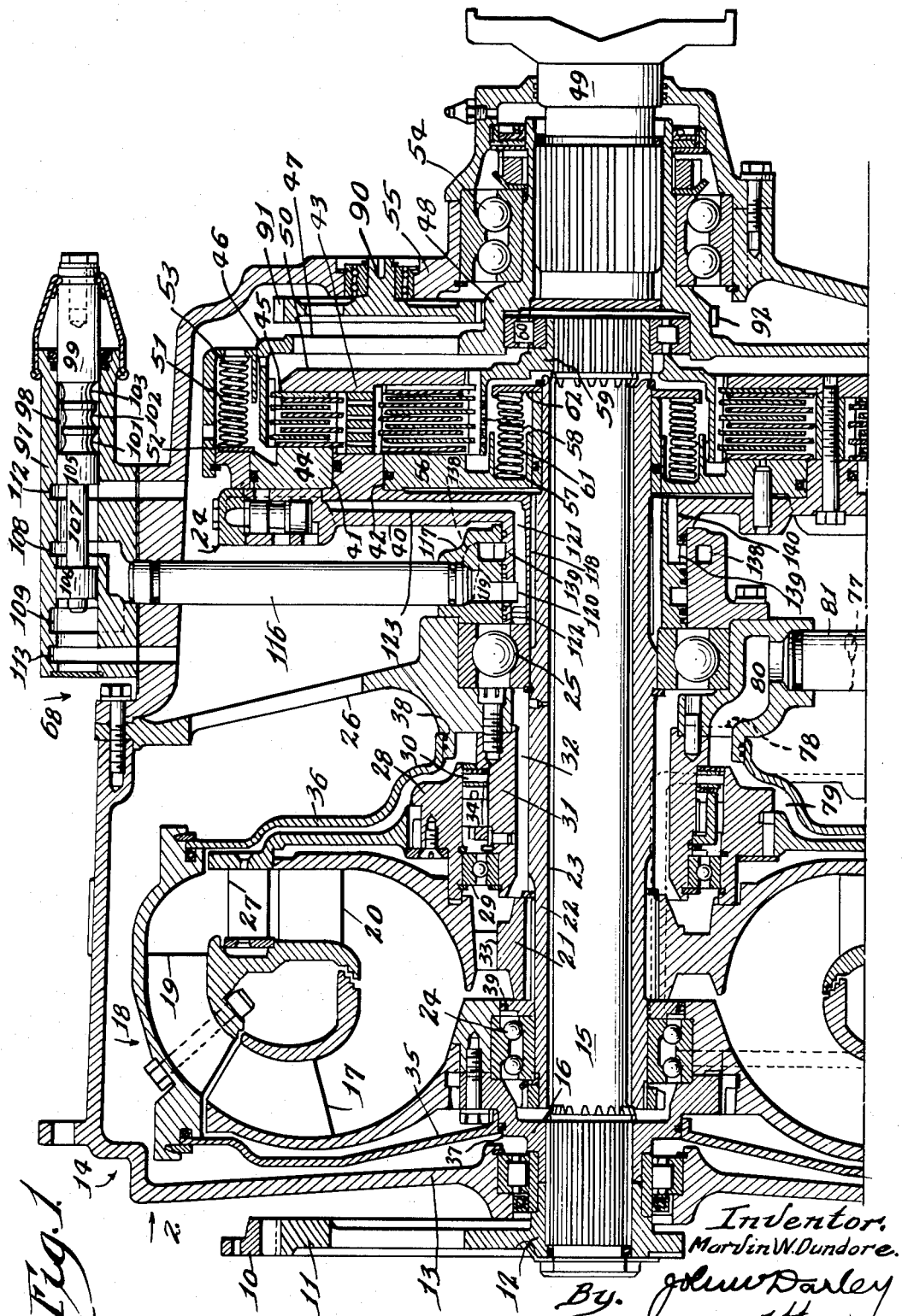
Fig. 1 is a fragmentary, sectional elevation of the transmission as taken along the irregular line 1—1 in Fig. 2, the clutches being shown in disengaged position.
Figure 2:
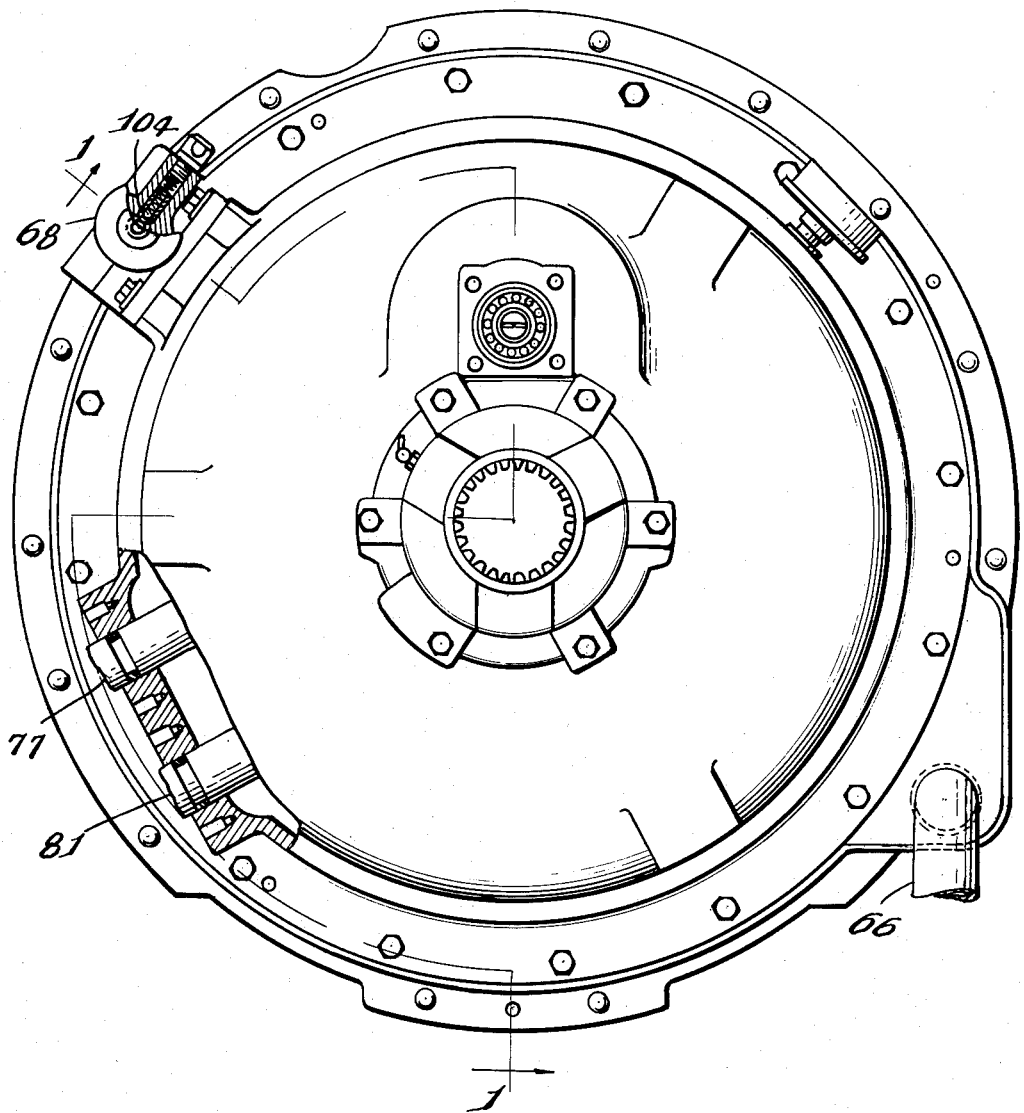
Fig. 2 is an end view looking in the direction of the arrow 2 in Fig. 1.

Referring to Fig. 1, the numeral 10 designates a driving ring that may be secured to an engine flywheel (not shown) or generally any power source and which has toothed, driving connection with a spider ring 11 having a hub 12 which is journaled in the forward end wall 13 of a transmission housing 14 and is splined to one end of an input or driving shaft 15 that always rotates at engine speed and extends within the housing.

Also journaled in the wall 13 and splined to the same end of the shaft 15 adjacent the hub 12 is a hub 16 which carries a pump 17 forming part of a hydraulic torque converter 18. The outlet and inlet ends of the pump 17 are operably related, respectively, to connected turbines 19 and 20 constituting first and second stages of the converter, the turbine 20 having a hub 21 which is splined to a sleeve 22 that surrounds and extends for the major part of the length of the shaft 15 and is spaced therefrom to define an elongated, annular chamber 23. The forward end of the sleeve 22 is journaled in a bearing 24 mounted within the pump hub 16 and another part of the sleeve is journaled in a bearing 25 mounted in an intermediate housing wall 26.

A reaction member 27 is located between the turbines 19 and 20 and functions in the characteristic manner with respect thereto when power is transmitted through the converter in torque multiplying range. The hub of the member 27 is keyed to a ring 28 that is journaled on spaced bearings 29 and 30 carried by a cylindrical extension 31 attached to the central part of the wall 26, the extension being spaced from the sleeve 22 to create an annular passage 32 whose forward end communicates through one or more ports 33 in the turbine hub 21 with the interior of the converter 18. Interposed between the ring 28 and extension 31 is a freewheel or overrunning clutch 34 of usual construction which is arranged to hold the reaction member 27 stationary during the torque multiplying range of the converter and to permit it to rotate freely with he pump 17 and turbines 19 and 20 during hydraulic coupling and direct drive.

Substantial losses of working liquid from the ends of the converter 18 are prevented by forward and rear annular cover plates 35 and 36 whose outer peripheries are connected to the turbine 19 and whose inner peripheries fit against piston ring seals 37 and 38 carried by the pump hub 16 and the wall 26, all respectively. Similar loss at the central portion of the converter is prevented by a piston ring seal 39 interposed radially between the pump hub 16 and sleeve 22 and axially between the turbine hub 21 and bearing 24.

An annular carrier 40 is splined to the sleeve 22 rearwardly of the wall 26 and its right face, as viewed in Fig. 1, is recessed to provide outer and inner concentric annular cylinders 41 and 42. The carrier forms the closed ends of the cylinders and extending from the carrier beyond the open ends of and between the cylinders is an externally and internally splined or toothed annulus 43.

An annular piston 44 is slidably mounted in the cylinder 41 in actuating relation to a plurailty of clutch plates 45, alternate plates having toothed and sliding engagement with the outer splined surface of the annulus 43 while the intervening plates are similarly engaged with a shell 46 formed integrally with an annular spider 47 having a hub 48 that is keyed to one end of an output shaft 49. The plates 45 are engaged by the piston 44 against an abutment ring 50 whose central portion is secured to the annulus 43. The piston 44, plates 45 and the outer portion of the ring 50 constitute the hydraulic drive clutch of the transmission which, when engaged, establishes drive through the converter 18, sleeve 22, carrier 40 and clutch plates 45 to the spider 47. When the actuating pressure on the piston 44 is removed, release of the clutch plates 45 is effected by a plurality of helical springs 51 that respectively abut a ring 52 mounted on the outer periphery of the piston 44 and an abutment ring 53 mounted on the carrier 40, the ring 52 abutting the carrier when the springs are fully extended. The spider hub 48 is journaled within a bearing 54 interposed therebetween and the rear end wall 55 of the housing 14 through which the shaft 49 extends.

An annular piston 56 is slidable in the cylinder 42 and is operably related to a plurality of clutch plates 57, alternate plates having toothed and sliding engagement with the inner splined surface of the annulus 43 while the intervening plates have similar engagement with a toothed shell 58 formed integrally with a hub 59 splined to the rear end of the driving shaft 15. The hub 59 is journaled within a bearing 60 interposed therebetween and the spider hub 48. The plates 57 are engaged by the piston 56 against the inner portion of the abutment ring 50 and release of these plates is effected by a plurality of helical springs 61 whose opposite ends respectively abut the piston 56 and ring 62 which fits on the sleeve 22 and is suitably held against axial movement. The piston 56, plates 57 and the inner portion of the abutment ring 50 form the direct drive clutch of the transmission.

Selectively hydraulic actuation of the hydraulic and direct drive clutches and the maintenance of a working pressure in the converter-cooler circuit are accomplished by the following instrumentalities (see Figs. 1, 2, 6 and 7).

An engine driven pump 63 withdraws oil through a pipe 64 from a sump 65 which is preferably remote from the lower part of the housing 14 and is connected to the latter by a pipe 66 whereby oil collected in the housing as presently described drains to the sump. The delivery side of the pump 63 connects by a pipe 67 with one side of a control valve 68 and included in the pipe 67 in series flow relation are an inlet orifice 69, an accumulator 70 having a spring loaded piston 71, and an outlet orifice 72 all for a purpose presently explained.

A pipe 73 connects the delivery pipe 67 between the pump 63 and inlet orifice 69 with the inlet of a conventional, pressure regulating valve 74 whose outlet connects with a pipe 75. The pressure in the latter pipe, controlled as presently described, is made effective against the spring actuated side of the valve 74 by connecting the right end thereof (see Fig. 6) with the pipe 75 through a pipe 76.

The pipe 75 connects with one end of a pipe 77 constituting the inlet to the converter 18 (see Figs. 1, 2 and 6) and the opposite end of the pipe 77 is mounted in the central portion of the wall 26 and communicates through a passage 78 with the annular passage 32 and thence through the ports 33 with the inner part of the converter circuit. The converter discharges just interiorly of the cover plate 36 and outwardly of the reaction member 27 into a space 79 which in turn connects with a passage 80, also in the central part of the wall 26, and thence with one end of a pipe 81 which serves as the outlet from the converter circuit. It will be understood that the pipes 77 and 81 are spaced from each other transversely of the transmission and that the passages 78 and 80 are similarly related. The pipe 81 feeds oil from the converter 18 to the inlet of a cooler 82 and the outlet of the latter connects by a pipe 83 with the inlet side of a conventional, pressure regulating valve 84 whose outlet connects by a pipe 85 with the pipe 64 and hence with the sump 65. A pipe 86 may also connect the pipe 85 with the spring actuated side of the valve 84 to drain any leakage oil to the sump and to insure that the regulated pressure is that which is due to the valve spring only. Bridged between the pipes 75 and 83 is a pipe 87 which includes a check valve 88 arranged to permit flow therethrough from the pipe 83 to the pipe 75, but to deny flow in the opposite direction for a purpose presently explained.

By way of example, the valve 74 is adjusted to open at 100 p. s. i. while the valve 84 is set to open at 50 p. s. i., but it will be apparent from Fig. 6 that these valves are series related and that the regulated pressure of the valve 84 back pressures the valve 74 through the pipe 76. Hence, by coupling the valves 74 and 84 in this manner, a pressure of 150 p. s. i. is available in the delivery pipe 67.

A second pump 89 is also provided for the transmission and is driven by a shaft 90 (see Fig. 1) which is drivingly connected to a gear 91 whose hub is journaled in the end wall 55 and which meshes with a pinion 92 formed integrally with the hub 48. The pump 89 can therefore be driven from the output shaft 49 whenever both clutches are disengaged and it is necessary to push the vehicle, such as a crawler type tractor, to start the engine. Under these conditions, the pump 89 furnishes pressure to engage both clutches as will be presently described.

The suction side of the pump 89 connects by a pipe 93 with the pipe 64 and hence with the sump 65 while the delivery side connects by a pipe 94 with the control valve 68 in generally opposed relation to the connection of the pipe 67 therewith, i. e., the deliveries from the pipes 67 and 94 are masked by the control valve 68 when in neutral position. A pressure regulating valve 95 is bridged around the pump 89 and may be adjusted to a pressure of 600 p. s. i. A drain pipe 96 connects the spring actuated side of the valve 95 with the suction pipe 93.

Figure 3:
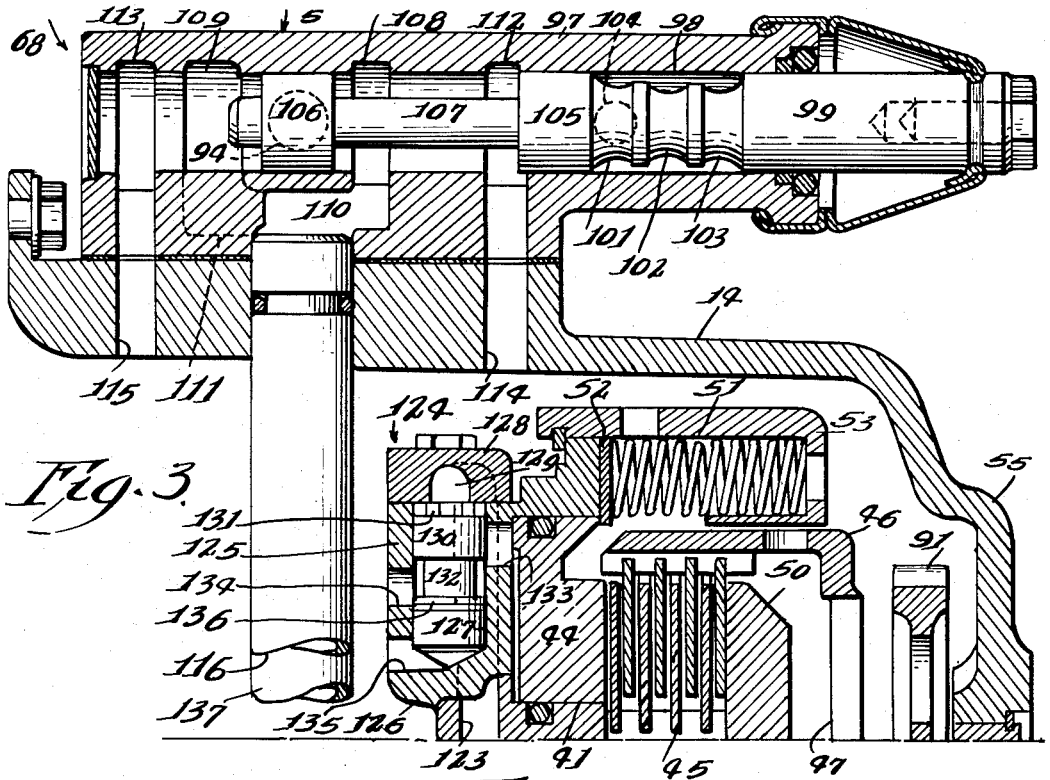
Fig. 3 is an enlarged sectional elevation of a part of the transmission including the hydraulic drive clutch, the dump valve therefor and the control valve for determining the actuation of both clutches, the valve being shown in neutral position and indicating the relation thereof to certain passages communicating with a pipe leading to the hydraulic drive clutch.
Figure 4:
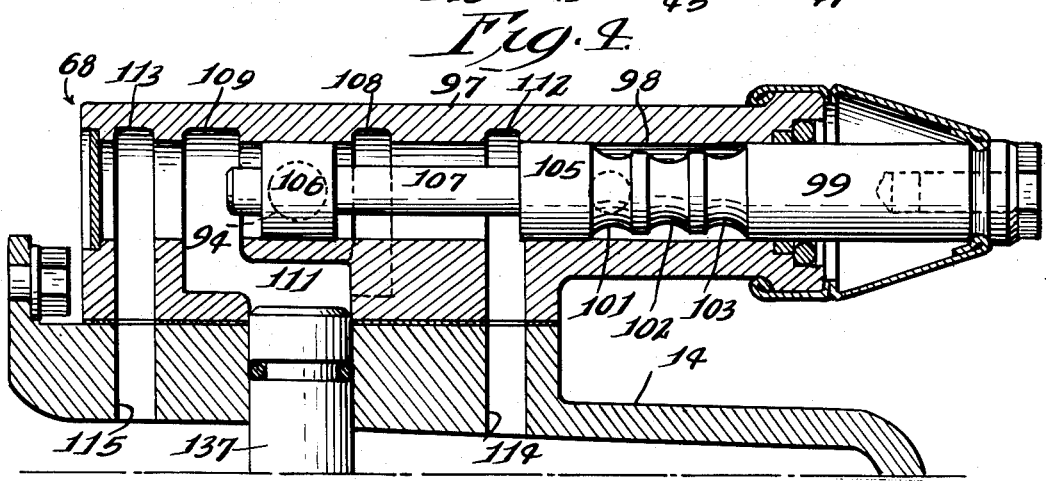
Fig. 4 is a view similar to Fig. 3, omitting the clutch, showing the relation of the valve to certain other passages communicating with another pipe leading to the direct drive clutch.
Figure 5:
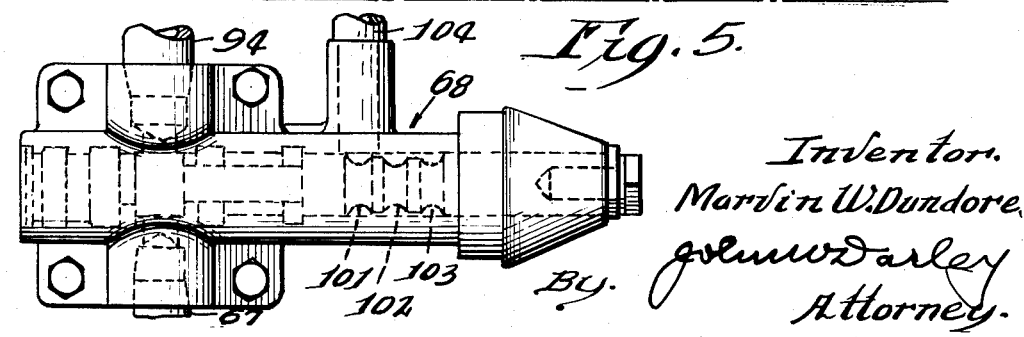
Fig. 5 is a plan view of the control valve looking in the direction of the arrow 5 in Fig. 3 and showing the opposed relation thereto of the delivery pipes from the engine and output shaft driven pumps.

Referring to Figs. 3, 4 and 5 which show the details of the control valve 68, the latter includes a casing 97 mounted on the housing 14 and having an elongated bore 98. Slidable in the bore 98 is a valve stem 99 whose right end (see Fig. 6) is connected to a pivoted actuating handle 100 whereby the stem may be reciprocated in the bore. For the purpose of holding the stem 99 in any selected position, it includes annular grooves 101, 102 and 103 spaced axially thereof and arranged to selectively engage a spring actuated detent 104 (see Fig. 2), the grooves respectively determining valve stem positions corresponding to neutral, hydraulic and direct drive conditions of the transmission.

The valve stem 99 further includes piston valves 105 and 106 which closely fit the bore 98 and are spaced axially by a reduced neck 107. Annular ports 108 and 109 surround the bore 98 on opposite sides of the piston 106 when the stem 99 occupies the neutral position shown in Fig. 3 and respectively communicate with chambers 110 and 111 in the casing 97 (see Figs. 3 and 4) which are displaced from each other in the casing. Annular ports 112 and 113 also surround the bore 98, the former, when the stem 99 is in the position shown in Fig. 3, being located just to the left of the piston valve 105 and the latter to the left of the port 109, the ports 112 and 113 communicating, respectively, through aligned passages in the casing 97 and the top wall of the housing 14 generally designated as exhaust passages 114 and 115. Any oil that flows through the latter passages collects in the bottom of the housing 14 and is returned to the sump 65 through the pipe 66.

The outer end of a pipe 116 extends through the top wall of the housing 14 in communication with the chamber 110 while the inner end is mounted in a ring 117 (see Fig. 1) secured to the central part of the housing wall 26 and in encircling and sealed relation to a hub 118 formed integral with the carrier 40. The inner end of the pipe 116 communicates through a chamber 119 provided in the ring 117 and an annular channel 120 formed in the outer surface of the hub 118 with one or more longitudinal passages 121, also provided in the hub 118, the left end of each passage 121 being closed by a plug 122. The opposite end of the passage or passages 121, as the case may be, connects with the inner end of one or more radial passages 123 provided in the carrier 40. For simplification, only one passage 121 and one passage 123 are illustrated.

Oil flowing through the passage 123 supplies actuating pressure to the hydraulic drive cylinder 41 and control of this flow is exercised by a dump valve 124, there being one such valve for each passage 123. Referring to Fig. 3, the dump valve 124 includes a casing 125 which may be integral with or attached to the carrier 40 adjacent the periphery thereof and offset circumferentially of the carrier so as to clear the passage 123, the lower or inner end of the casing 125 being closed by a wall 126 and its bore 127 being open at its outer end. Closing the outer end of the casing 125 is a cover 128 having a chamber 129 whose ends constantly communicate respectively with the outer end of the passage 123 and the outer end of the bore 127.

Slidable in the bore 127 is a piston valve 130 whose movements outwardly are limited by bosses 131 for abutting the cover 128 and inwardly by a reduced extension 132 for abutting the wall 126. The piston valve 130 is shown in dumping position in Fig. 3 in which it occupies its outermost position and sufficiently uncovers a port 133 providing communication between the cylinder 41 and bore 127 and thence around the extension 132 through a port 134 in the casing 125 connecting the bore 127 with the interior of the housing 14 and hence with the sump 65. A third port 135 in the casing 125 at the inner end thereof provides exhaust for any oil that may leak past the guide shoulder 136 provided on the inner end of the extension 132. When pump pressure is effective in the passage 123, it shifts the piston valve 130 inward, or downward as viewed in Fig. 3, to thereby mask the exhaust port 134 and uncover the port 133 which is thereby placed in communication with the chamber 129 so that pressure is supplied to the hydraulic drive cylinder 41.

The dump valve operates on the principle of pump pressure shifting the piston valve 130 inwardly to thereby engage the hydraulic drive clutch, but when pump pressure to this clutch is interrupted, then at any speed of the engine, the centrifugal force due to the weight of the piston valve 130 is greater than that due to the weight of the column of oil in the passage 123. Under the latter condition, therefore, the valve shifts outwardly to the quick dumping position shown in Fig. 3 whereupon the springs 51 release the hydraulic drive clutch. Due to the smaller radius of the direct drive clutch, dump valves are not necessary therefor since the release springs 61 effectively counteract the centrifugal action on the relatively small masses of oil en route to the cylinder for this clutch when pump pressure is interrupted.

The passages through which oil is transferred from the control valve 68 to the direct drive cylinder 42 will now be described. Referring to Figs. 1 and 4, the outer end of a pipe 137 extends through the top wall of the housing 14 in communication with the chamber 111, the pipe 137 being spaced from the pipe 116 transversely of the transmission and the inner end is mounted in the ring 117 in communication with a chamber 138, also included in the ring 117. The chamber 138 connects with an annular channel 139 provided in the outer surface of the carrier hub 118 and this channel in turn connects with one or more longitudinal passages 140 in the hub 118 that communicate with the direct drive cylinder 42.

In describing the operation of the transmission, it will be assumed that the vehicle or tractor is at rest with the engine idling, thus driving the converter pump 17 and the pump 63, and that the valve stem 99 is in the neutral position shown in Fig. 3. The piston valve 106 then masks the delivery ends of the pipes 67 and 94 leading from the engine and output shaft driven pumps 63 and 89, respectively, although the latter pump is not then operating. Pump pressure is therefore denied to the outer ends of the pipes 116 and 137 and hence to the hydraulic and direct drive clutch cylinders 41 and 42. At the same time, the pipe 116 connects with the sump 65 through the chamber 110, annular port 108, bore 98, annular port 112, passage 114, the housing 14 and the pipe 66, while the pipe 137 connects with the sump 65 through the chamber 111, annular port 109, bore 98, annular port 113, passage 115, the housing 14 and the pipe 66. Accordingly, the dump piston valve 130 occupies the position shown in Fig. 3 and both clutches are disengaged. It will be assumed further that the output shaft 49 is connected to a sliding gear transmission since parts of the unit shown in Fig. 1 are arranged to facilitate gear shifting when the clutches are disengaged by reducing the inertia of parts aft of the clutches.

The operator then shifts the sliding gear transmission into first speed and moves the valve stem 99 towards the left until the detent 104 engages the groove 102. The piston valve 105 then masks the annular port 112 and hence the exhaust passage 114 while the piston valve 106 uncovers the delivery ends of the pipes 67 and 94 so that oil under pressure from the pump 63 flows to the annular port 108 and thence through the pipe 116 and the connected passages and through the dump valve 124 to the clutch cylinder 41 to thereby engage the hydraulic drive clutch. At the same time, the piston valve 106 still denies pressure to the chamber 111 so that the direct drive clutch remains disengaged, the latter chamber remaining in communication with the sump 65.

An important feature of the invention resides in the use of the orifices 69 and 72 and the accumulator 70 to soften the engagement of the clutches. Without these parts, it has been ascertained that the engagement of the hydraulic drive clutch, for example, is too severe. With the control valve stem 99 shifted to hydraulic drive position as noted above, the pressure in the various pipe lines and passages leading to the hydraulic drive clutch would drop to from 20 p. s. i. to 40 p. s. i. while the clutch piston 44 was taking up the clearance between the clutch plates against the relatively light resistance exerted by the clutch springs 51. Eventually, the clutch plates would be clamped solidly against the abutment ring 50 so that axial movement of these plates would cease abruptly and the pressure in the system leading to the clutch would almost immediately rise to 150 p. s. i. which is the controlled pressure in the delivery pipe 67. Hence, the hydraulic drive clutch would engage with a jerk and with consequent shock to the vehicle and operator.

The accumulator 70, which has a capacity equal or slightly less than the quantity of oil required to engage the hydraulic drive clutch, assists in solving the above problem in the following manner. While the control valve 68 is in neutral position, the accumulator 70 is in the retracted or filled position shown in Fig. 6 and when the valve 68 is shifted to hydraulic drive position, the accumulator 70 immediately discharges to the clutch cylinder 41 almost enough oil to engage the hydraulic drive clutch. When the accumulator 70 is discharged, the piston 71 is moved to the left, as viewed in Fig. 6, by pressure in the delivery pipe 67 to thereby recharge the accumulator. Hence, the accumulator operates as a storage reservoir whose contents are immediately available for the clutch cylinder 41 when the valve 68 is moved and the necessity for recharging the accumulator entails a draw on the output of the pump 63 which reduces the rate of pressure build up in the system after the piston 44 has been shifted by the discharge of the accumulator to a position clamping the plates of the hydraulic drive clutch against the abutment ring 50. Therefore, clutch engagement is smoother since torque build up in the clutch proceeds at a lower rate than would be possible without an accumulator.

For purpose of disclosure, a spring loaded accumulator is shown, but any suitable design may be employed so long as it exhibits the above operating characteristics. Specifically, an accumulator as shown which performed satisfactorily included a 3″ piston and had a capacity of about 10 cu. in. and its spring was designed to operate from empty to full over a pressure range of from 20 p. s. i. to approximately the full controlled pressure of 150 p. s. i. Leakage past the accumulator piston 71 may be returned through a drain pipe 141 to the sump 65.

Further control on the rate of clutch engagement is effected by the orifices 69 and 72 having suggested diameters of .21″ and .25″, respectively. In the case of the orifice 69 which is located ahead of the accumulator 70 in the direction of flow, it has been ascertained that a proper rate of clutch engagement can be secured only by controlling two variables, i. e., the capacity of the pump 63 which varies almost directly with engine speed and the pressure drop in the oil line which varies with oil temperature. Since the pump must have sufficient capacity to secure a correct rate of clutch engagement at low engine speed, it follows that at a substantially higher engine speed, the pump delivery would be too high for smooth engagement. In this connection, it will be understood and as more fully developed later that one of the characteristics of the transmission is a capacity to change from hydraulic to direct drive an vice versa with a full power shift in either direction and at any engine speed. In other words, this shift can be made at speeds other than idling. Hence, the orifice 69 throttles the oil delivery of the pump 63 at high engine speed and since a sharp edged orifice is relatively insensitive to viscosity changes in the oil, it is possible to employ a pipe diameter that minimizes friction loss through the pipe. Hence, a substantially uniform rate of clutch engagement can be attained regardless of the quantity of oil delivered by the pump 63.

The orifice 72 restricts the rate of oil delivery by the accumulator 70 to the hydraulic drive clutch. This restriction is necessary because it has been ascertained that the clutch carrier 40 exercises a centrifugal pumping action on the oil in the radial passages 123 (see Fig. 1). With the control valve 68 in neutral position, the converter pump 17 is rotating at engine speed and the carrier 40 which is connected to the converter turbine 20 is rotating at near engine speed. Therefore, when the valve 68 is shifted to hydraulic drive position and the engine is speeded to take up the load, the rotation of the carrier 40 will attempt to draw oil from the accumulator 70 at a rate too fast for smooth clutch engagement. For example, at a speed of 1800 R. P. M., the carrier 40 will develop a pressure of about 90 p. s. i. which is excessive. The orifice 72 effectively controls this situation throughout the operating range.

From the foregoing, it will be apparent that the cooperative action of the orifices 69 and 72 and the accumulator 70 efficiently controls the oil flow in a single pipe line against otherwise disturbing influences produced by different sources.

With the hydraulic drive clutch engaged, the engine is connected to the output shaft 49 through the torque converter 18, the reaction member 27 being held from rotating in reverse direction by the overrunning clutch 34 and the vehicle begins moving. When sufficient acceleration of the vehicle has been accomplished to enable the selection of a higher speed ratio in the gear transmission, it is necessary to first disengage the hydraulic drive clutch by returning the valve stem to the position shown in Fig. 3 and thereafter make the gear shift in the usual way.

During this gear change, the inertia of the spider 47, through which the hydraulic drive clutch had been transmitting power to the output shaft 49, exerts a flywheel effect on this shaft that would tend to hamper an easy gear shift, but means are provided for retarding the rotation of the spider during this phase of the operation. Since the pump 89 is driven by the spider 47 and further since at the instant of gear shift, the delivery of this pump is blocked by the neutral position of the control valve 68 and all output flow thereof must pass through its regulating valve 95, a definite torque drag is imposed on the spider 47 which slows the output shaft 49 sufficiently to facilitate gear shifting. A braking action of any desired degree can be accomplished by adjusting to the required amount the pressure in the relief circuit of the pump 89 so long as this pressure is not below that utilized for engaging the clutches. Whenever the control valve 68 is in positions other than neutral, the pump 89 merely delivers oil to the hydraulic system under the regulation provided by the valves 74 and 84.

The foregoing operation is repeated through all the gear changes in the gear transmission up to and normally including high gear, the control valve 68 being reciprocated between neutral and hydraulic drive positions as above described with all power flow being transmitted through the converter 18. This mode of operation takes advantage of the high starting torque and capacity for rapid, smooth acceleration afforded by the converter 18. Each time that the control valve 68 is shifted to hydraulic drive position, the rate of engagement of the hydraulic drive clutch is controlled by the orifices 69 and 72 and the accumulator 70.

When the vehicle is accelerated to the desired speed, the drive may be maintained through the converter 18 which then acts as a hydraulic coupling since the reaction member 27 is free to rotate by reason of the overrunning clutch 34, but it is ordinarily desirable to provide direct drive between the engine and the load. This result is accomplished by further shifting the valve stem 99 towards the left until the detent 104 seats in the groove 103. The piston valve 105 then occupies a position further to the left of the annular port 112 but short of the annular port 108 so that the hydraulic drive clutch is unaffected and remains engaged. The piston valve 106 however masks the annular exhaust port 113 and uncovers the port 109 so that pressure oil from the pumps 63 and 89 then flows through the pipe 137 and the connected passages described above to the direct drive cylinder 42 to thereby engage the associated clutch. The drive is then through the shaft 15, both clutches which are in series relation and the spider 47 to the output shaft 49. It will be apparent that the rate of engagement of the direct drive clutch is also controlled by the orifices 69 and 72 and the accumulator 70 since these three elements have a common flow control relation to both clutches.

Prior to this direct drive connection, the speed of the carrier 40 is less than that of the shaft 15 due to the usual loss through the converter, but when the direct drive clutch is engaged, the speeds of the carrier 40 and shaft 15 are equalized. Since the hydraulic drive clutch remains engaged, the converter pump 17 and the turbines 19 and 20 rotate at the same or engine speed. Hence, there will not be any reaction against the blades of the reaction member 27 which, as it is released by the overrunning clutch 34, will begin to rotate with the pump and turbines. Since power is not then being transmitted through the converter and all parts thereof are rotating at substantially the same speed, the power losses in the converter circuit are negligible. Actually, the reaction member 27 rotates at a slightly slower speed than the pump and turbines due to the drag of the bearings and the overrunning clutch, but the difference is small.

If the load becomes too heavy to be carried in direct drive, the valve stem 99 is shifted to the hydraulic drive position, i. e., with the detent 104 seating in the groove 102 to thereby deny pressure to the direct drive clutch whose cylinder is connected to the sump by uncovering the port 109 and placing the same in communication with the exhaust port 113 while the hydraulic drive clutch remains engaged. The shift from hydraulic to direct drive and vice versa may be made at any speed ratio in the gear transmission and at any engine speed, but when a shift is made in the gear transmission, both clutches must be disengaged by moving the control valve 68 to neutral position.

A particular advantage of the above constuction is that the transmission is characterized by a full power shift, the engine at no time being completely disconnected from the output shaft 49 while the changes from one drive to the other are being effected. As load conditions vary for any given gear situation in the gear transmission, the drive through the transmission 14 may be shifted at will from hydraulic to direct and from direct to hydraulic with the hydraulic drive clutch being always engaged and the rate of engagement of each clutch being controlled at any engine speed by the orifices 69 and 72 and the accumulator 70.

Another important feature of the transmission resides in the method of circulating oil through the cooler 82. This method includes a basic, pump forced circulation that is active at all times and an increase in such circulation due to normal pressure differences in the converter when in the torque multiplying range since the heating problem is then more acute.

As will be apparent from Fig. 6, all oil delivered by the pumps 63 and 89 which is not required for operation of the clutches flows through the hydraulic system including the pressure regulating valve 74, pipes 75 and 77, working passages of the converter 18, pipe 81, cooler 82, pipe 83, pressure regulating valve 84, and the pipe 85 to the sump 65. To insure that the delivery of the pump 89, during engagement of the hydraulic drive clutch 45 or of both clutches, is not restricted by the orifices 69 and 72, a bypass pipe 141 including a check valve 142 is bridged around the assembly including the orifices 69 and 72 and the accumulator 70. The check valve 142 is arranged to prevent the output of the pump 63 from flowing through the pipe 141, but permits the output of the pump 89 under the stated conditions to pass therethrough to the pipe 73 and thence through the converter-cooler circuit.

This circulation occurs when the power flow through the converter 18 is above torque multiplying range, i. e., it is acting as a coupling, and also during direct drive. During either of these periods, pressure differences within the converter are not sufficient to cause flow through the cooler 82 to an adequate extent, circulation through the latter being due to the pumps 63 and 89 under the control of the valve 84 which establishes a basic pressure in the converter-cooler circuit that is assumed, for example, to be 50 p. s. i. Under these conditions, short circuiting of the oil flow from the pipe 75 to the pipe 83 through the pipe 87 is prevented by the check valve 88.

However, when the converter is acting as such, i. e., it is operating in torque multiplying range, it is desirable to increase the circulation through the cooler 82 to dissipate the additional heat. This is accomplished by utilizing the pressure within the converter and whenever this pressure exceeds 50 p. s. i., oil flowing out of the cooler 82 divides, part moving through the valve 84 and the remainder through the pipe 87 to the pipe 77 for return to the converter. Hence, this arrangement is highly flexible in operation, being automatically responsive to the variant cooling requirements as power flow through the transmission is shifted between pure converter drive on the one hand and hydraulic coupling and direct drive on the other.

It will be apparent that some variations are possible in the use of the above system. For example, the pressure regulating valve 74 can be eliminated if the pressure regulating valve 84 is adjusted to 150 p. s. i., the pressures in the clutch and converter-cooler circuits then being the same. A comparable systemic condition, i. e., elimination of the valve 74, can be obtained if sufficient clutch capacity is employed to enable the use in the clutch circuit of a pressure of 50 p. s. i., in which event the regulating valve 84 is set to open at 50 p. s. i. In other words, the converter can be operated at a high basic pressure with a determined clutch capacity, or at a substantially lower basic pressure if the clutch capacity is increased.

I claim:

1. In a power transmission, the combination of a first hydraulic system comprising an hydraulic power circuit means having a torque multiplying range, an inlet line to the power circuit means including a first pressure regulating valve, an outlet line leading from the power circuit means and including in series flow relation a cooler and a second pressure regulating valve, a second hydraulic system including a pair of hydraulically actuated clutches respectively engageable to connect the power circuit means to the load and the load directly to a power source, a pump common to both systems for establishing pressure therein, the second valve being arranged in back pressuring relation to the first valve whereby a lower pressure is maintained in the first system than in the second system, and a pipe connecting the inlet line to the outlet line between the delivery side of the cooler and the second valve and conditioned for flow only towards the inlet line for bypassing thereto a part of the increased flow in the first system when the power circuit means is operating in torque multiplying range.

2. In a power transmission having a hydraulic power circuit means having a torque multiplying range, a system for cooling the power circuit means in both ranges including an inlet line to the power circuit means, an outlet line leading from the power circuit means and including a cooler, a pump for establishing a basic circulation in the system during both ranges, and a pipe connecting the inlet line to the outlet line on the delivery side of the cooler and conditioned for flow only towards the inlet line for bypassing thereto a part of the increased flow in the system when the power circuit means is operating in the torque multiplying range.

3. In a power transmission, the combination of a first hydraulic system comprising an hydraulic power circuit means having a torque multiplying range, an inlet line to the power circuit means, an outlet line leading from the power circuit means and including in series flow relation a cooler and a pressure regulating valve, a second hydraulic system including a pair of hydraulically actuated clutches respectively engageable to connect the power circuit means to the load and the load directly to a power source, a pump common to both systems for establishing pressure therein, and a pipe connecting the inlet line to the outlet line between the delivery side of the cooler and the valve and conditioned for flow only towards the inlet line for bypassing thereto a part of the increased flow in the first system when the power circuit means is operating in torque multiplying range.

References Cited in the file of this patent

UNITED STATES PATENTS

| | | |
|---|---|---|
| 2,105,625 | Wichtendahl | Jan. 18, 1938 |
| 2,544,551 | Black | Mar. 6, 1951 |
| 2,568,007 | Jandasek | Sept. 18, 1951 |
| 2,578,876 | Banner | Dec. 18, 1951 |
| 2,642,168 | Black et al. | June 16, 1953 |
| 2,702,616 | Black et al. | Feb. 22, 1955 |

FOREIGN PATENTS

| | | |
|---|---|---|
| 646,103 | Germany | Mar. 20, 1937 |